Patented Dec. 30, 1952

2,623,841

UNITED STATES PATENT OFFICE 2,623,841

SPERMICIDAL COMPOSITIONS

Abraham Taub, New York, N. Y., assignor to Julius Schmid, Inc., New York, N. Y., a corporation of New York No Drawing. Application November 21, 1950, Serial No. 196,962

12 Claims. (Cl. 167—58)

The present invention relates to improvements in spermicidal compositions.

This application is a continuation-in-part of my application Serial No. 609,323, filed August 6, 1945 (now abandoned), for Spermicidal Compositions, and is based on the discovery that a class of substances differing substantially from the spermicidal agents disclosed in said application and having certain desired improved properties may be used in combination with other modifying agents described in the said application with greatly improved results without deleterious effects and without irritation when in contact with delicate body membranes.

In my application Serial No. 609,323, the invention includes a spermicidal agent which is a fatty acid ester of a polyethylene glycol or of a polyoxyethylene glycol in combination with a thickening agent, such as gum tragacanth, a plasticizing agent, such as glycerine, and a buffer to maintain the pH of the spermicidal composition within a desired range. In the combination, alcohol, such as ethyl alcohol, is preferably used to transparentize the produce in order to appeal to aesthetic tastes, or senses. This monofatty acid esters of polyoxyethylene glycols were found to be spermicidal without the caustic or severely irritating effects of the previously known spermicides of the prior art. This class of non-ionic spermicidal agents contains the hydroxyl group is uncombined form.

I have found a new class of spermicides which represents the monofatty acid esters of derivatives of polyoxyethyleneglycol which do not contain a free hydroxyl group and are more potent spermicides than those heretofore known and are more stable and have better keeping qualities in both acid and alkaline media than previously known non-ionic spermicides. Furthermore the new class of spermicides which I have discovered does not dry out and therefore when used in jellies reduces the quantity or proportion of humectant needed in the composition. These new compounds are bland and nonirritating and tend to produce clear jellies without the use of transparentizing agents such as alcohol.

The new class of substances which I have found to be particularly adapted for use as spermicides represents the monofatty acid esters of alkoxy polyoxyethylene glycols and is defined by the generic formula:

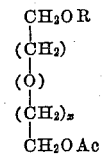

in which "OR" is an alkyl ether (or alkoxy) grouping, "$x$" is an integer of at least 2, and "Ac" is an acyl radical of a fatty acid containing at least 6 carbon atoms.

An example of this class of spermicides is the compound methoxy polyoxyethylene glycol 550 monolaurate, in which "550" represents the molecular weight of the polyoxyethylene glycol. This compound has the constitutional formula $CH_3O-CH_2(CH_2-O-CH_2)_{11}CH_2-O-CO(CH_2)_{10}CH_3$. Other examples are: ethoxy polyoxyethylene glycol mono-oleate; propoxy polyoxyethylene glycol monocaproate; methoxy polyoxyethylene glycol monostearate; butoxy polyoxyethylene glycol monomyristate. It will be understood that readily available commercial polyoxyethylene glycols have approximate molecular weights of about 200, 300, 350, 370, 550, 750 and higher. The approximate molecular weights are used since adjacent homologs may be present in commercial mixtures. However, pure compounds of these polyethylene glycols, where the integer as represented by the letter "$x$" in the above generic formula is two or more, can be obtained.

One of the objects of the present invention is to provide a novel spermicidal composition which can effectively destroy the sperm within a relatively short period of time without irritation of the delicate vaginal mucosa or other detrimental effects and which does not decompose even after long standing, and which is more stable in acid and alkaline media than previously known non-ionic spermicides heretofore used.

Another object of the invention is to provide a novel spermicidal jelly composition which does not dry out and in which the quantity of humectant material required to prevent drying out of the spermicidal composition may be greatly reduced as compared with the amounts or proportions heretofore used for this purpose.

Another object of the invention is to provide a novel spermicidal composition which is bland and non-irritating and which tends to produce clear jellies without the use of transparentizing agents, such as alcohols.

Another object of the invention is to provide a spermicidal composition in which the spermicidal agent is composed of a compound of polyoxyethylene glycol having no free reactive groups in the molecule, so as to increase the stability and keeping qualities of the compounds without loss of potency of the spermicidal agent.

It is a further object of the invention to provide the said spermicidal compounds in molecular or finely divided form in a vehicle which provides barrier action, effective adhesiveness and spreading power in the vaginal tract and which is readily miscible with the vaginal and sperm secretions. In accordance with this object of the invention, the spermicidal composition may be in the form of a jelly, or cream, or powder, or suppository, or impregnated tampon to accomplish the above objectives.

A still further object of the invention is to provide a novel spermicidal composition having rapid effective spermicidal action and which is gentle and non-irritating to vaginal tissue, and which is adapted to operate effectively in acid, neutral or alkaline environment.

Moreover, it is another object of the invention to provide a novel spermicidal composition which does not melt or flow out at body temperatures and which is water washable, non-toxic, non-irritant and non-staining.

Other objects and advantages of the invention will become apparent from the following description:

Broadly stated, the present invention contemplates an improved spermicidal composition involving a novel combination of chemical substances including a spermicidal agent of high spermicidal potency but unreactive with other components of the composition, a thickening agent and a plasticizing agent, with or without a buffer to control the pH of the composition. The spermicidal agent which I have discovered is uniquely adapted to my novel spermicidal composition is a mono fatty acid ester of an alkoxy polyoxyethylene glycol, of the general generic formula above which may be more simply expressed as $CH_2OR(CH_2OCH_2)_xCH_2OAc$, in which, as above stated "OR" designates an alkoxy or alkyl ether grouping, "$x$" is an integer of 2 or more, and "Ac" represents the acyl radical of a fatty acid containing at least six carbon atoms.

The invention may be readily understood from a consideration of the following examples illustrative of specific embodiments of the said invention:

*Example No. I*

| Agent | Percentage |
| --- | --- |
| Methoxy polyoxyethylene glycol (550) monolaurate | 3.0 |
| Propylene glycol | 5.0 |
| Butyl parahydroxybenzoate | .02 |
| Sodium carboxymethyl cellulose | 2.6 |
| Perfume | .02 |
| Water, q. s | 100.0 |

In this composition, the methoxy polyoxyethylene glycol monolaurate is the spermicide which is made from a polyoxyethylene glycol having a molecular weight of approximately 550 or has this approximate molecular weight in the final spermicide compound. The propylene glycol serves as a plasticizing agent in the composition and the butyl parahydroxybenzoate serves as a preservative agent. The sodium carboxymethyl cellulose component serves as a thickening agent and the small proportion of perfume serves to provide a pleasing odor to the composition. The water which is added to the composition operates as a vehicle and is added in sufficient amount to form the jelly composition. The jelly may be made by mixing the first four ingredients to a thin slurry, then adding the perfume, and subsequently pouring the entire mixture into the water vehicle which has been previously heated to a temperature of about 85° C., and mixing for about 5 to 10 minutes, after which the composition is substantially homogeneous. It is to be understood that the process for making the jelly from the ingredients or constituents may be varied as will be understood by those skilled in the art, and furthermore that the components of the composition may be varied to provide the desired effects and consistency, adhesiveness, spreading power and other characteristics

*Example II (Jelly)*

| Agent | Chemical composition | Percentage |
| --- | --- | --- |
| Spermicidal agent | Propoxy polyoxyethylene glycol (350) monopalmitate. | 4.0 |
| Alkalinizing agent | Triethanolamine | 2.0 |
| Plasticizing agent | Triethylene glycol | 3.0 |
| Transparentizing agent | Ethyl alcohol | 5.0 |
| Thickening agent | Hydroxyethyl cellulose | 7.0 |
| Preservative | Sodium benzoate | 0.3 |
| Odor improving agent | Perfume | 0.05 |
| Vehicle | Water, q. s | 100.0 |

*Example III (Jelly)*

| Agent | Chemical composition | Percentage |
| --- | --- | --- |
| Spermicidal agent | Methoxy polyoxyethylene glycol (750) mono-oleate. | 3.0 |
| Plasticizing agent | Glycerin | 6.0 |
| Acidifying agent | Boric Acid | 1.0 |
| Thickening agent | Tragacanth | 2.5 |
| Preservative | Propyl parahydroxybenzoate | 0.15 |
| Odor improving agent | Perfume | 0.02 |
| Vehicle | Water (q. s.) | 100.0 |

*Example IV (Cream)*

| Agent | Chemical composition | Percentage |
| --- | --- | --- |
| Spermicidal agent | Butoxy polyoxyethylene glycol (300) monostearate. | 5.0 |
| Creamy consistency former. | Stearic acid | 22.0 |
| Plasticizing agent | Glycerin | 5.0 |
| Preservative | Butyl parahydroxybenzoate | 0.02 |
| Thickening agent | Sodium carboxymethyl cellulose. | 0.1 |
| Saponifying agent | Sodium hydroxide | 1.0 |
| Odor improving agent | Perfume | 0.2 |
| Vehicle | Water (q. s.) | 100.0 |

*Example V (Powder)*

| Agent | Chemical composition | Percentage |
| --- | --- | --- |
| Spermicidal agent | Ethoxy polyoxyethylene glycol (370) monostearate. | 5.0 |
| Absorbent | Milk Sugar (Lactose) | 40.0 |
| Alkalinizer | Sodium bicarbonate (Buffer—joint action—bicarb. citric, boric). | 50.0 |
| Buffer | Citric Acid | 1.0 |
| Do | Boric Acid | 2.0 |
| Thickening agent | Hydroxyethyl cellulose (barrier action). | 2.0 |

This powder is used for insufflation, and the sodium bicarbonate, citric acid and boric acid assist in spreading or dispersion in addition to combined buffer action in the composition.

Example VI (Suppository)

| Agent | Chemical composition | Percentage |
|---|---|---|
| Spermicidal agent | Methoxy polyoxyethylene glycol (370) monolaurate. | 15.0 |
| Thickening agent | Sodium carboxymethyl cellulose. | 2.8 |
| Plasticizing agent | Propylene glycol monostearate. | 82.2 |

Example VII (Suppository)

| Agent | Chemical composition | Percentage |
|---|---|---|
| Spermicidal agent | Methoxy polyoxyethylene glycol (750) monolaurate. | 10.0 |
| Thickening agent | Hydroxyethyl cellulose. | 3.0 |
| Plasticizing agent | Polyethylene glycol dilaurate. | 10.0 |
| Do | Polyethylene glycol (4,000) | 50.0 |
| Do | Polyethylene glycol (400) | 27.0 |

Example VIII (Tampons)

| Agent | Chemical composition | Percentage |
|---|---|---|
| Spermicidal agent | Ethoxy polyoxyethylene glycol (550) caproate. | 20.0 |
| Thickening agent | Sodium carboxymethyl cellulose. | 1.0 |
| Preservative | Propyl parahydroxybenzoate. | 0.1 |
| Vehicle | Water (q. s.) | 100.0 |

This solution is then allowed to saturate tampons of cotton or other textile absorbent fabric and is then dried.

The above examples are given to serve as a guide in carrying out the invention and are not to be construed as limitations or a limitation of the invention. It will be understood that various changes or modifications may be made as will be apparent to those skilled in the art without departing from the spirit of the invention or the scope of the claims hereto annexed. For example, in the spermicidal agent, while the alkoxy group is preferably a methoxy, ethoxy, propoxy or butoxy radical, a higher alkoxy radical may be substituted in the compound, although those below $C_{10}H_{21}O-$ are preferred. Similarly, while the acyl radical of the fatty acids set forth are preferred, in forming the mono esters of the spermicidal agent, esters of the fatty acids of the group consisting of caproic, heptylic, caprylic, nonylic, capric, lauric, myristic, palmitic, margaric, stearic and oleic acids may be used.

Having thus described my invention, what is claimed as new is:

1. An improved spermicidal composition effective within a relatively short period of time without irritating delicate body membranes contacting therewith which comprises a spermicidal agent consisting of an alkoxy polyoxyethylene glycol ester of a fatty acid having at least six carbon atoms and having the generic formula $CH_2OR(CH_2OCH_2)_xCH_2OAc$, in which "OR" is an alkyl ether grouping, R having a chain length not exceeding four atoms, "$x$" is an integer of at least 2, and "'Ac" is an acyl radical of a fatty acid having at least six carbon atoms, a water dispersible thickening agent having adhesive action in the composition, and a plasticizing agent, said composition being adapted for use in an aqueous vehicle.

2. An improved spermicidal composition effective within a relatively short period of time without irritating delicate body membranes contacting therewith which comprises a bland adhesive vehicle and a spermicidal agent consisting of an alkoxy polyoxyethylene glycol ester of a fatty acid having at least six carbon atoms and having no uncombined reactive group connected therewith, the alkoxy radical being selected from the group consisting of methoxy, ethoxy, propoxy and butoxy radicals, a water dispersible thickening agent having adhesive action in the composition, a plasticizing agent and a buffer serving to regulate the pH of the composition, said composition being readily miscible with vaginal and sperm secretions.

3. An improved spermicidal composition effective within a relatively short period of time without irritating delicate body membranes contacting therewith which comprises a bland adhesive vehicle and a spermicidal agent consisting of an alkoxy polyoxyethylene glycol ester of a fatty acid, the alkoxy radical being selected from the group consisting of methoxy, ethoxy, propoxy, and butoxy radicals and the combined fatty acid being selected from the group consisting of caproic, heptylic, caprylic, nonylic, capric, lauric, myristic, palmitic, margaric, stearic and oleic acids, said spermicidal agent thus having no uncombined reactive group connected therewith and greatly increasing the stability of the spermicidal composition, a water dispersible thickening agent and a plasticizing agent, said composition being readily miscible with vaginal and sperm secretions.

4. An improved spermicidal composition effective within a relatively short period of time without irritating delicate body membranes contacting therewith which comprises a spermicidal agent consisting of an alkoxy polyoxyethylene glycol ester of a fatty acid, the alkoxy radical being selected from the group consisting of methoxy, ethoxy, propoxy and butoxy radicals and the combined fatty acid being selected from the group consisting of caproic, heptylic, caprylic, nonylic, capric, lauric, myristic, palmitic, margaric, stearic and oleic acids, said spermicidal agent having no uncombined reactive group connected therewith, thereby greatly increasing the stability of the spermicidal composition, said polyoxyethylene glycol portion of the spermicidal agent having a molecular weight of from about 200 to 750, a water dispersible thickening agent having adhesive action in the composition and a plasticizing agent, said composition being readily miscible with vaginal and sperm secretions.

5. An improved spermicidal composition in accordance with claim 4 in which the spermicidal agent is methoxy polyoxyethylene glycol (550) monolaurate and the thickening agent is sodium carboxymethyl cellulose.

6. An improved spermicidal composition in accordance with claim 2, in which the spermicidal agent is methoxy polyoxyethylene glycol (750) mono-oleate, the thickening agent is tragacanth, the plasticizing agent is glycerin and the buffer is boric acid and sodium bicarbonate.

7. An improved spermicidal cream composition in accordance with claim 3 in which the spermicidal agent is butoxy polyoxyethylene glycol (300) monostearate, the thickening agent is sodium carboxymethyl cellulose, the plasticizing agent is glycerin, and a creamy consistency former of stearic acid is added to provide a creamy consistency to the composition.

8. An improved spermicidal powder composition effective within a relatively short period of time without irritating delicate body membranes contacting therewith which comprises a spermicidal agent consisting of an alkoxy polyoxyethylene glycol ester of a fatty acid having at least six carbon atoms, the alkoxy radical being selected from the group consisting of methoxy, ethoxy, propoxy and butoxy radicals, said spermicidal agent having no uncombined reactive group connected therewith, a water dispersible thickening agent having barrier action, an absorbent of milk sugar and a buffer to control the pH when admixed with vaginal secretions.

9. An improved spermicidal powder composition in accordance with claim 8, in which the spermicidal agent is ethoxy polyoxyethylene glycol monostearate, and in which the buffer is sodium bicarbonate, citric acid and boric acid, with a predominant component of sodium bicarbonate, serving to provide spreading action.

10. An improved spermicidal suppository composition which comprises a spermicidal agent consisting of methoxy polyoxyethylene glycol monolaurate, a water dispersible thickening agent and a plasticizing agent of propylene glycol monostearate in predominance in the composition.

11. An improved spermicidal suppository composition in accordance with claim 10, in which the thickening agent is hydroxyethyl cellulose and to which is added polyethylene glycol in predominant proportions.

12. An improved spermicidal composition effective within a relatively short period of time without irritating delicate body membranes contacting therewith and adapted for use with tampons which comprises a spermicidal agent consisting of ethoxy polyoxyethylene glycol caproate, a water dispersible thickening agent of sodium carboxymethyl cellulose and a preservative.

ABRAHAM TAUB.

REFERENCES CITED

The following references are of record in the file of this patent:

UNITED STATES PATENTS

| Number | Name | Date |
|---|---|---|
| 2,467,884 | Elias | Apr. 19, 1949 |

OTHER REFERENCES

New and Nonofficial Remedies, 1951, pages xxxi to xxxii, J. P. Lippincott.